July 17, 1934.  P. A. JACOBSON  1,966,552
SAUSAGE LINKING MACHINE
Filed Jan. 29, 1932  2 Sheets-Sheet 1
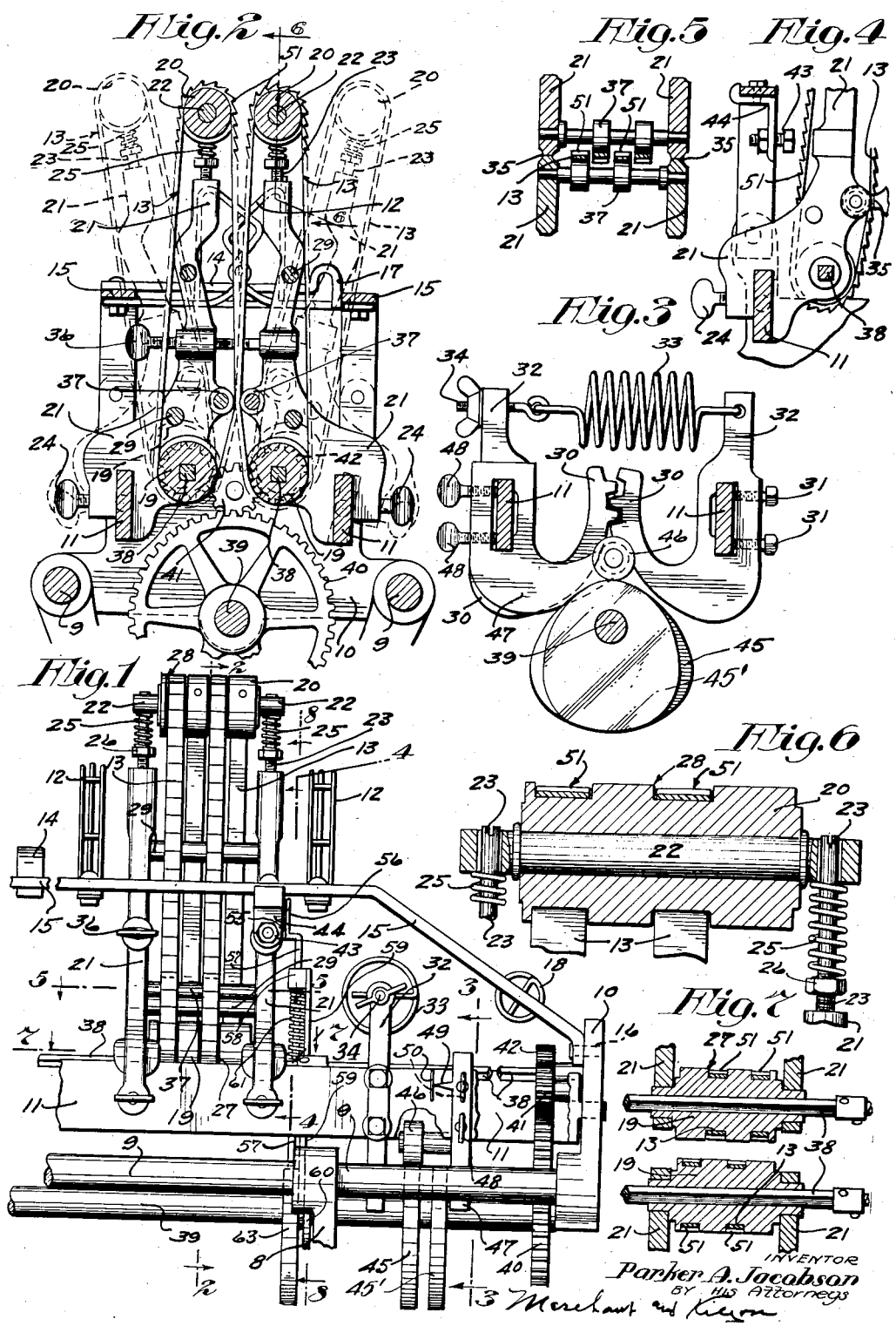

July 17, 1934.  P. A. JACOBSON  1,966,552
SAUSAGE LINKING MACHINE
Filed Jan. 29, 1932  2 Sheets-Sheet 2
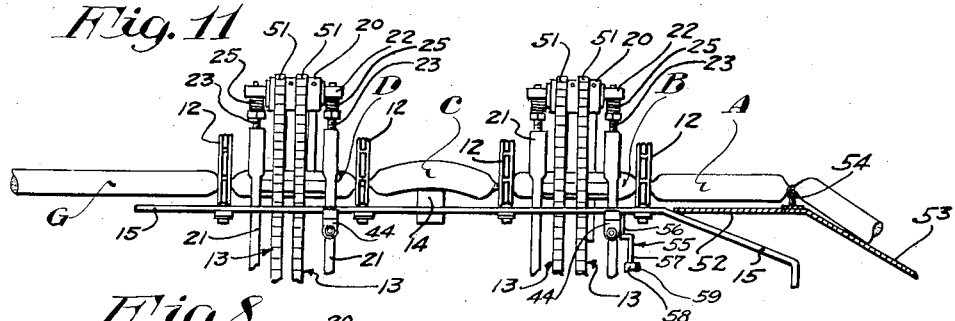
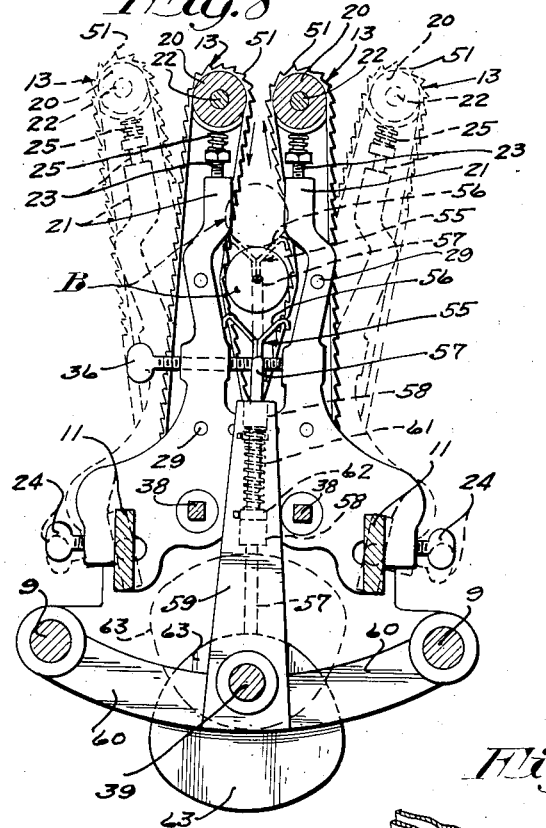
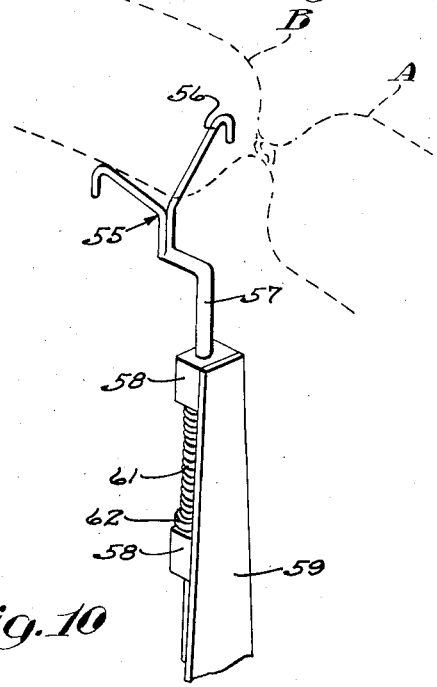
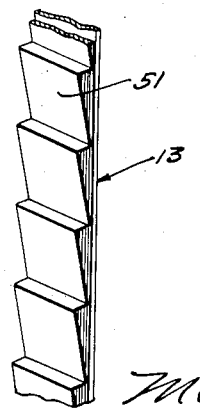
Inventor
Parker A. Jacobson
By his Attorneys Patented July 17, 1934

1,966,552

UNITED STATES PATENT OFFICE 1,966,552

SAUSAGE-LINKING MACHINE

Parker A. Jacobson, Winona, Minn.

Application January 29, 1932, Serial No. 589,629

15 Claims. (Cl. 17—34)

My present invention relates to a sausage linking machine of the type disclosed and broadly claimed in my copending application of the same title, filed June 13, 1930 under Serial Number 460,935, which is now Patent Number 1,901,452, dated March 14, 1933, and has for its object the provision of certain improvements or refinements in the operation thereof as will hereinafter appear.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary side elevation of the improved sausage twisting machine;

Fig. 2 is a view in transverse vertical section taken on the line 2—2 of Fig. 1, with some parts removed and other parts shown in different positions by means of broken lines;

Fig. 3 is a view partly in elevation and partly in vertical section taken on the line 3—3 of Fig. 1;

Fig. 4 is a fragmentary detail view with some parts sectioned on the line 4—4 of Fig. 1;

Fig. 5 is a detail view with some parts sectioned on the line 5—5 of Fig. 1;

Fig. 6 is a fragmentary detail view principally in section taken on the line 6—6 of Fig. 2, on an enlarged scale;

Fig. 7 is a detail view with some parts sectioned on the line 7—7 of Fig. 1;

Fig. 8 is a view partly in elevation and partly in transverse section taken on the line 8—8 of Fig. 1; some parts being shown in different positions by means of broken lines;

Fig. 9 is a fragmentary perspective view of the brake and also fragmentarily illustrating by means of broken lines two connected sausage links;

Fig. 10 is a fragmentary perspective view of one of the twisting belts; and

Fig. 11 is a fragmentary side elevation of the machine in which is a sausage casing formed, in part, into links.

Of the parts of the frame of the improved machine fragmentarily illustrated it is important to note the end members 8, the pair of longitudinal side bars 9 and the bearing head 10. A pair of laterally spaced rock-shafts 11, in the form of flat bars set vertically edgewise parallel to said side bars, have on their ends trunnions journaled in seats in the bearing head 10.

The machine may include two or any desired number of units, depending on the number of links to be simultaneously twisted, and each unit, only one of which is illustrated, includes spacers and squeezers 12, for displacing the filler in a sausage casing at longitudinally spaced points to sausage casing at longitudinally spaced points to form links. The unit further includes twisting belts 13, for twisting alternate links one at a time in opposite directions, and supports 14 for holding intervening links or the links between adjacent units, one at a time, to prevent the same from being turned by the twisting of the adjacent links.

The spacers and squeezers are carried by a pair of parallel flat bars 15 which extend parallel to the side bars 9 and their end portions, only one of which is shown, project downwardly and outwardly and are pivoted at 16 to the bearing head 10 for rocking movement toward and from each other.

The link supports 14 are in the form of flat bars which extend transversely of the machine and have one of their ends rigidly secured to one of the bars 15 and their other ends are bent laterally downward to form stops 17 arranged to engage the other bar 15 to limit the approaching movement of the bars 15, and hence of the cooperating members of the spacers and squeezers 12. A pair of coiled springs 18, only one of which is shown, connect the two bars 15 and are under strain to draw the same toward each other and normally hold said bars positioned by the link supports 14.

The tension of the springs 18 is sufficient to draw the cooperating members of the spacers and squeezers 12 together to displace the filler in the sausage casing and gather said casing into a compact form for twisting without danger of breaking the same.

There are four twisting belts 13 in each unit arranged in opposing pairs and the belts of said pairs are edgewise spaced and staggered (see Figs. 1 and 7). One belt 13 of each pair runs over a lower driven pulley 19 and an idle upper pulley 20 and said lower pulley has on its ends trunnions journaled in a pair of laterally spaced upright arms 21 and said upper pulley is loose on a fixed shaft 22 mounted on a pair of screw posts 23 which form extensions of the arms 21. The two pairs of arms 21 are mounted, one pair on each rock-shaft 11, and their lower ends are bifurcated to receive said shafts and support the arms 21 with freedom for sliding movement longitudinally thereon. Thumb-screws 24 rigidly hold the arms 21 where adjusted on the rock-shafts 11. The posts 23 extend into bores in the upper end portions of the arms 21 and have screw-threaded engagement therewith. Said posts 23 at their upper end portions extend through radial holes in the end portions of the shaft 22 and hold said shaft from turning but with freedom for movement longitudinally on said posts.

Coiled springs 25 encircling the posts 23 rest on abutments 26 on said posts and yieldingly support the shaft 22, and hence the upper roller 20, for bodily movement parallel to the axis of the lower roller 19 or for angular movement in respect thereto. The posts 23 have in their upper ends nicks for a screw driver by which said posts may be turned to screw the same into or out of the arms 21 to vary the operative length thereof and thereby act as tighteners for the belts 13. Formed in the pulleys 19 and 20 are peripheral grooves 27 and 28, respectively, for the belts 13 to hold the same against edgewise movement on said pulleys and in staggered arrangement. The arms 21 of each pair are rigidly connected by upper and lower cross-tie rods 29.

A pair of intermeshing segmental gears 30 connect the rock-shafts 11 for common rotary movement to open and close the opposing pairs of arms 21 at the same speed and in predetermined relation. The rock-shafts 11 extend through seats in the hubs of the gears 30 and hold said gears from turning about the axes of the rock-shafts 11 but with freedom for longitudinal sliding movement thereon. Set-screws 31 hold the hubs of the gears 30 where adjusted on the rock-shafts 11. Upstanding posts 32 integral with the hubs of the gears 30 are connected by a coiled spring 33 under strain to turn the shafts 11 and close the belts 13 onto a sausage casing therebetween. One end of the spring 33 is attached to one of the posts 32 by a thumb-nut-equipped eyebolt 34 by which said spring may be tensioned. Positive stops 35 on the opposing edges of the arms 21 limit the approaching movement of said arms.

An adjustable stop 36 is also provided for limiting the approaching movement of the arms 21 for casings of different diameters. This stop is, as shown, a long thumb-screw having threaded engagement with one of the arms 21 of the two pairs and arranged to impinge against the opposite arm of the other pair.

A pair of guide rolls 37 is provided for the belts 13 of each unit and are journaled, one on each pair of arms 21, and over which the inner or operative runs of the respective belts 13 run. The two guide rolls 37 are in opposing relation, and all four of the belts 13 as they run thereover are substantially edgewise aligned, see Fig. 5, with the opposing runs of said belt in diverging relation therefrom. Obviously, the diverging sections of the belts 13 above the guide rolls 37 form a notch to receive and hold a casing to be twisted.

The lower pulleys 19 are driven by a pair of square shafts 38 which extend through correspondingly formed holes in said pulleys at the axes thereof and support said pulleys for rotation therewith but with freedom for adjustment longitudinally thereon. For the purpose of this case it will not be necessary to consider the adjustment of the machine for forming links of different lengths.

The shafts 38 are driven in reverse directions from a shaft 39 having a large gear 40 which meshes with a small idle gear 41 which, in turn, meshes with a pair of gears 42, one on each of the shafts 38. The shaft 39 extends parallel to the side bars 9 midway therebetween, is journaled in the bearing head 10 and driven by an electric motor, not shown, and the idle gear 41 is journaled on said bearing head.

The cooperating members of the spacers and squeezers 12 are positively opened by the arms 21 which engage, during the opening of the arms 21, adjustable abutments 43 in the form of screws that have threaded engagement with fixed brackets 44 on the bars 14. By reference to Fig. 4 it will be noted that the arms 21 have a limited independent opening movement before they engage the abutments 43 to open the spacers and squeezers 12. The clearance between the arms 21 and the abutments 43 permits slight opening and closing movements of the belts 13 during the twisting of a casing without moving the spacers and squeezers 12. Furthermore, these independent opening and closing movements of the belts 13 permit the spacers and squeezers 12 to complete their operation on a casing prior to the time in which the belts 13 start their turning action of the casing. One of the rock-shafts 11 is positively operated, and at the same time operates the other rock-shaft through the connected gears 30 to open the belts 13 and the spacers and squeezers 12, by either one of a pair of axially spaced fixed cams 45 and 45' on the shaft 39 and a cooperating cam roller 46 journaled on a crank-arm 47 on the first noted rock-shaft 11. The crank-arm 47 is adjustable longitudinally on the respective rock-shafts 11 and rigidly secured thereto by a pair of thumb-screws 48 to position the cam roller 46 over either one of the cams 45 and 45' to be operated thereby.

A pointer 49 on the crank-arm 47 and cooperating graduations 50 on the respective rock-shaft 11 are provided for positioning the cam roller 46 over either one of the cams 45'. The two cams 45 are designed for holding the belts 13 open for different periods of time during each cycle of said cams so that casings of different sizes will be twisted the same number of times. Obviously it will take a longer period of time to twist a casing of a large diameter than a casing of a small diameter hence, when twisting relatively small casings the cam roller 46 will be adjusted over the large cam 45 so that the belts 13 act thereon for a relatively short period of time and when twisting a relatively large casing the cam roller 46 will be adjusted over the small cam 45' so that the belts 13 act for a relatively long period of time on the casing.

The belts 13, in their preferred form, have on their opposing faces cleats 51 which extend transversely of said belts and are spaced longitudinally thereof. These cleats 51 are preferably, but not necessarily, made from rubber and are in the form of wide one-way ratchet teeth. The cleats 51 on the opposing faces of the belts 13, which move in opposite directions, are reversely arranged. As these cleats 51 produce considerable friction on a sausage casing the belts 13 may be relatively loose so that they produce very little pressure on the casing, thus materially reducing the danger of breaking the same.

The arrangement of the belts 13 is highly important wherein they are edgewise spaced and staggered, in that they do not engage a casing on opposite sides, and hence, do not produce a squeezing action that would tend to burst the casing. These edge-wise spaced belts 13 also engage a link of sausage for a considerable portion of its length and supports the same for turning movement without undue pressure. Obviously the springs 25 will permit the upper pulleys 20 to yield and thereby prevent the belts 13 from applying too much pressure to a casing.

The machine illustrated in Fig. 11 consists of two units and will form four links at a time. In forming these links the links B and D are twisted in reverse directions by the belts 13; the link C, between the two links B and D, that are being twisted, is held from twisting or turning by the support 14 on which it rests and the link A is held from turning by the adjacent spacer and squeezer, and by a gauge member as will hereinafter appear. At the front end of the machine is a hood or cover 52 for certain of the movable parts of the machine and it has a downwardly inclined deck 53 over which the formed links slide onto a table or other support, not shown.

On the cover 52 is a gauge member 54 that determines the length of the link A which corresponds to that of the links B, C and D formed by the spacers and squeezers. In feeding the casing G through the machine the operator grasps the link C in one hand, holds the casing G in the other hand, so that it is free to slide therethrough, and then lifts the casing and link to clear the open spacers and squeezers 12 and twisting belts 13 and moves the same endwise until the twisted end of the casing G is at the gauge 54 and then lowers the casing G onto said squeezers and belts before they are closed thereon to form the next group of four links.

During this feeding of the casing G through the machine there is a tendency for the links just formed to untwist before they are placed on the deck 53 and at which time they are in angular relation to each other which holds the same from untwisting. The grip the operator has on the link C and casing G prevents said casing and link from untwisting and the link D is held by said link C and casing G from untwisting.

To prevent the link B from untwisting an automatic brake 55 is provided and timed so that the same is released during the formation of the links and set at the completion of the twisting thereof and during the opening movements of the spacers and belts. This brake 55 includes an offset fork 56 on the upper end of an upright rod 57 mounted in a pair of vertically spaced bearings 58 on the upper end portion of an upright arm 59. Said arm 59 has on its lower end a cross-tie member 60 rigidly held by the side bars 9 which extend through hubs on the ends of said member. The driven shaft 39 extends through a hub on the arm 59 and the cross-tie member 60.

A compression spring 61 encircling the brake rod 57 is compressed between the upper bearings 58 and a collar 62 on said rod between the two bearings 58. The spring 61 is under strain to retract or move the fork 56 downward and the engagement of the collar 62 with the lower bearing 58 limits this movement of the fork 56. To set the brake 55 there is provided a cam 63 on the driven shaft 39 and operative on the lower end of the rod 57 once during each rotation of said shaft to lift the same and cause the fork 56 to engage the outer end portion of the link B and lift the same so that said link is supported in the crotch of said fork.

The frictional contact between the fork and link B will hold said link from untwisting. At the time the operator lifts the formed links and the casing G from the machine said links are moved, as previously stated, by the operator into angular positions with respect to each other which holds the same from untwisting; and hence, by the time the link B is lifted from the fork 56 the brake will have served its purpose. By the time the casing G is placed between the twisting belts and squeezers for the next operation to form other links the cam 63 will have moved into a position to release the compressed spring 61 and allow the same to retract the brake so that the same is entirely out of the way during the twisting of the next group of links.

What I claim is:

1. In a sausage linking machine, a pair of rock-shafts, a pair of upright arms on the rock-shafts, a lower pulley and an upper pulley journaled on each pair of arms, a twisting belt arranged to run over each pair of pulleys, the belts being edgewise spaced the one from the other, and a pair of guide rolls journaled on the arms and over which the opposing sections of the belts run and are held thereby pressed toward each other and substantially edgewise aligned where they pass over said rolls.

2. In a sausage linking machine, means for forming a filled casing into links, cooperating members for twisting the links, timed means for operating the link-forming means and the twisting members, and an automatic brake actuated by the timed means for preventing one of the links from untwisting when the twisting means is operated to release the formed links, said brake being in the form of a vertically movable fork arranged to engage said link and lift the same when said brake is operated to hold the link.

3. In a sausage linking machine having a pair of twisting belts in opposing relation and spaced edgewise for action on opposite sides of a sausage link at longitudinally spaced points, whereby the sausage link is unsupported on the opposite side from each belt.

4. In a sausage linking machine having three twisting belts, one of which is in opposing relation to the other two, said three belts being in staggered relation and spaced edgewise for action on opposite sides of a sausage link at longitudinally spaced points, whereby the sausage link is unsupported on the opposite side from each belt.

5. In a sausage linking machine having four twisting belts, two of which are in opposing relation to the other two, said four belts being staggered and spaced edgewise for action on opposite sides of a sausage link at longitudinally spaced points, whereby the sausage link is unsupported on the side opposite each belt.

6. The structure defined in claim 5 which further includes guide rolls over which the opposing sections of the belt run and are held thereby pressed toward each other and substantially aligned edgewise where they pass over said rolls.

7. In a sausage linking machine, a pair of rock-shafts, upright arms on the rock-shafts, a pair of cooperating twisting belts mounted on the arms for opening and closing movements under the action of the rock-shafts, yielding means normally holding the rock-shafts in a position in which the belts are closed, positive means for operating the rock-shafts to open the belts, a pair of cooperating spacers and squeezers mounted for opening and closing movements, other yielding means normally holding the spacers and squeezers closed with freedom for opening movement with respect to the opening movement of the belts, said arms being constructed and arranged to open the spacers and squeezers when operated to open the twisting belts and to control the closing movement of the spacers and squeezers by the respective yielding means.

8. The structure defined in claim 7 which further includes adjustable stop means for limiting the movement of the arms to close the belts and other stop means for limiting the closing movement of the spacers and squeezers.

9. The structure defined in claim 7 which further includes adjustable means, operable at will, to vary the initial opening movement of the spacers and squeezers by the arms.

10. In a sausage linking machine, two pairs of spacers and squeezers and a pair of cooperating twisting belts between the two pairs of spacers and squeezers, means for operating the belts, means for intermittently opening and closing the spacers and squeezers, means for intermittently opening and closing the belts in timed relation to the opening and closing of the spacers and squeezers, and means adjustable, at will, to vary the number of times a link of sausage is twisted by the belts during the period of time the spacers and squeezers are held closed on a sausage casing.

11. In a sausage linking machine, two pairs of spacers and squeezers and a pair of cooperating twisting belts between the two pairs of spacers and squeezers, means for operating the belts, means for intermittently opening and closing the spacers and squeezers, means for intermittently opening and closing the belts in timed relation to the opening and closing of the spacers and squeezers, and cam means adjustable, at will, to vary the period of time the belts are held closed with respect to the period of time the spacers and squeezers are held closed and thereby vary the number of times a link of sausage is twisted by the belts during the period of time the spacers and squeezers are held closed on the sausage casing.

12. In a sausage linking machine, means for forming a filled casing into links, cooperating members for twisting the links, a reciprocatory brake arranged, when projected, to lift one of the links to prevent the same from untwisting when the twisting means is operated to release the formed links, and means for reciprocating the brake.

13. The structure defined in claim 12 in which the brake is yieldingly held with respect to its reciprocating means.

14. The structure defined in claim 3 in which said belts have on their faces transverse cleats that are spaced longitudinally of the belts, said cleats being in the form of one-way ratchet teeth, said structure further including means for driving the belts in the same direction, whereby the upwardly moving cleats on the operative faces of one of the belts will tend to lift the link and the downwardly moving cleats on the operative faces of the other belt tend to move the link downwardly.

15. In a sausage linking machine, a pair of substantially parallel rock-shafts, a pair of upright arms on each rock-shaft, a lower pulley and an upper pulley journaled on each pair of arms, a pair of edgewise spaced twisting belts arranged to run over the two pulleys on each pair of arms, and yielding means supporting one of the pulleys on each pair of arms for bodily movement toward the other pulley thereon and for a limited tilting movement at either end in a plane extending between the axes about which the respective pulleys turn.

PARKER A. JACOBSON.